United States Patent [19]
Bossart et al.

[11] 3,790,348
[45] Feb. 5, 1974

[54] APPARATUS FOR DETERMINING THE CARBON MONOXIDE, METHANE AND TOTAL HYDROCARBONS CONTENT IN AIR

[75] Inventors: Clayton J. Bossart, Monroeville; Albert A. Poli, Pittsburgh, both of Pa.

[73] Assignee: Mine Safety Appliances Company, Pittsburgh, Pa.

[22] Filed: Mar. 22, 1972

[21] Appl. No.: 237,106

[52] U.S. Cl............. 23/254 EF, 23/230 PC, 55/67, 55/386, 73/23.1
[51] Int. Cl.. B01d 53/00, G01n 31/08, G01n 31/12
[58] Field of Search.........23/232 C, 254 R, 254 EF, 23/230 PC, 232 R; 73/23.1; 55/67, 197, 386

[56] References Cited
UNITED STATES PATENTS

| | | |
|---|---|---|
| 3,250,057 | 5/1966 | Clarke ........................... 73/23.1 X |
| 3,381,519 | 5/1968 | Ashmead et al. .................. 73/23.1 |
| 3,385,101 | 5/1968 | Roof .................................. 73/23.1 |
| 3,545,929 | 12/1970 | Linnenbom et al............ 23/230 PC |

Primary Examiner—Robert M. Reese
Attorney, Agent, or Firm—Brown, Murray, Flick & Peckham

[57] ABSTRACT

An air sample to be analyzed for carbon monoxide and methane is delivered to a chromatograph column that is connected by a reactor with a hydrogen flame ionization detector. The reactor converts carbon monoxide in the sample into methane. The amount of carbon monoxide and methane in the sample is determined by measuring the electrical conductivity of the detector. To measure total hydrocarbons in the impure air being sampled, a stream of the sample air is delivered to a conduit communicating with the detector. When total hydrocarbons are not being detected, a stream of pure air is delivered to the conduit continuously to establish a reference point for the analyses.

8 Claims, 4 Drawing Figures

APPARATUS FOR DETERMINING THE CARBON MONOXIDE, METHANE AND TOTAL HYDROCARBONS CONTENT IN AIR

There are several specially constructed gas chromatographs on the market for air quality monitoring of low parts per million of carbon monoxide methane and total hydrocarbons. A conventional gas sampling valve and column system are used to separate the carbon monoxide and methane from the air sample. Detection is usually accomplished by using a hydrogen flame ionization detector. Detection of the carbon monoxide is possible because a catalytic hydrogenator is employed after the separation column in order to convert the carbon monoxide to methane. From the standpoint of air pollution criteria, hydrocarbons other than methane which are termed reactive hydrocarbons, are of greater importance. In order to monitor total hydrocarbons, these special gas chromatographs employ a second gas sampling system to deliver a total air sample directly to the hydrogen flame ionization detector without separation. Thus, the reactive hydrocarbon level may be determined by difference.

While that is a relatively simple technique, it does have decided disadvantages, particularly at the lowest concentration levels. It is well recognized by those skilled in the art of hydrogen flame ionization detectors that, despite the theory of operation, such detectors do display some response to inorganic gases, particularly oxygen. This does not create a problem with carbon monoxide and methane because they are chromatographically separated from the air or oxygen peak, but the peak for total hydrocarbons is superimposed on the air peak and therefore significant errors may result depending upon the amount of oxygen in the sample. There are different ways of minimizing this error but they are not satisfactory and the effect cannot be eliminated entirely anyway. Furthermore, the requirement for a second sampling valve whose sample volume must be carefully temperature and pressure controlled involves more complexity and cost.

It is among the objects of this invention to provide apparatus for determining the amount of carbon monoxide and methane and total hydrocarbons in impure air, in which total hydrocarbon analysis is independent of total sample flow, in which a carrier gas is not required for total hydrocarbon analysis, in which the zero level for hydrocarbon analysis is identical to the zero level reading of the carbon monoxide and methane analysis, in which a semi-continuous pneumatic sampling technique replaces the slug-sampling technique for total hydrocarbons, in which one of the sample valves and its related parts is replaced by a simple valve and back pressure regulator, and in which the analyzer is ready for total hydrocarbon analysis at any time in the chromatogram between peaks or after all peaks have emerged.

The invention is illustrated in the accompanying drawings, in which.

Figure 1:
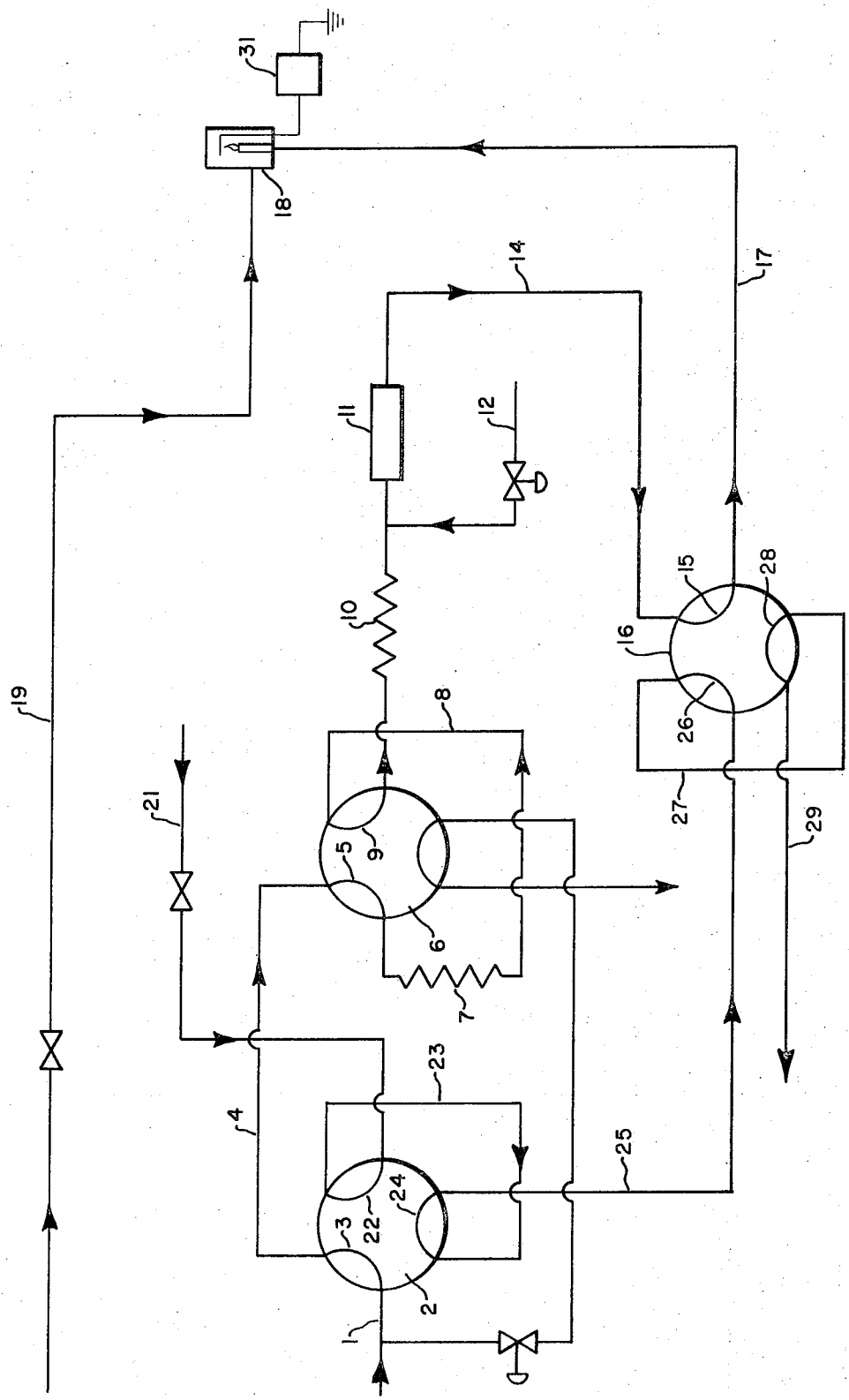
FIG. 1 is a diagrammatic view of a typical prior art analyzer.

Referring to FIG. 1 of the drawings, which shows the prior art, a carrier gas such as helium flows from a suitable source through a line 1 to a sample valve 2 provided with a passage 3 that in a first or normal position connects it with a line 4 connected with a passage 5 in a backflush valve 6. From this passage the carrier gas flows through a chromatograph column 7 and a line 8 to another passage 9 through the same valve and then through a second column 10 to a catalytic hydrogenator 11. This reactor, to which hydrogen is delivered through a line 12, is for the purpose of converting carbon monoxide to methane. The carrier gas leaves the reactor and flows through a line 14 to a passage 15 in a second sample valve 16 that is connected by a line 17 to the inlet of a hydrogen flame ionization detector 18 of conventional construction. Combustion air for the detector is obtained through a line 19 from a suitable source.

At the same time that the helium is flowing through the two sample valves, impure air that is to be sampled is flowing from a suitable source through a line 21 to a second passage 22 through the first sample valve 2 and then through a short tube or loop 23 to a third passage 24 in the same valve and then out through a line 25 to a second passage 26 in the second sample valve 16. The outlet of this passage is connected by a short tube or loop 27 with a third passage 28 in the same valve, which in turn is connected by a line 29 to the atmosphere. Thus, the sample air flows continuously through both sample valves at this time while it is being by-passed by the carrier gas.

In order to analyze the air for carbon monoxide and methane, the first sample valve 2 is switched to connect its first passage 3 with the outlet of the tube loop 23 and to connect the inlet of that loop, by way of passage 22, with the line 4 leading to the backflush valve 6. This reverses the flow through the loop so that the carrier gas carries the air sample that is isolated in the loop into the line 4 leading to the backflush valve and the columns. At the same time, the third passage 24 in the first valve connects the sampling line 21 with the line 25 leading to the second sample valve 16. The sample carried along through the two columns undergoes separation in the second column 10 to form carbon monoxide and methane, and the monoxide is changed into methane in the reactor 11. The result is that the measuring apparatus, such as a recorder 31, connected with the detector 18 indicates the amount of carbon monoxide and methane in the sample. The original methane in the sample reaches the recorder first, followed immediately by the methane produced by converting the carbon monoxide.

To now analyze for total hydrocarbons in the air being sampled, the first valve 2 is switched back to its original position so that once again only helium flows through the columns to the second sample valve 16. However, the second valve is shifted to cause its first passage 15 to connect the line 14 from the reactor to the inlet of the tube loop 27. At the same time, the passage 28 connects the outlet of the tube loop with the line 17 leading to the detector, while the remaining passage 26 connects the line 25 from the first valve with the vented line 29 of valve 16. The helium now carries the air sample that was isolated in tube loop 27 directly to the detector without the sample going through the columns and reactor, so the detector measures total hydrocarbons. It will be seen that both measurements are of short "slugs" of air samples from tube loops 23 and 27.

Figure 2:
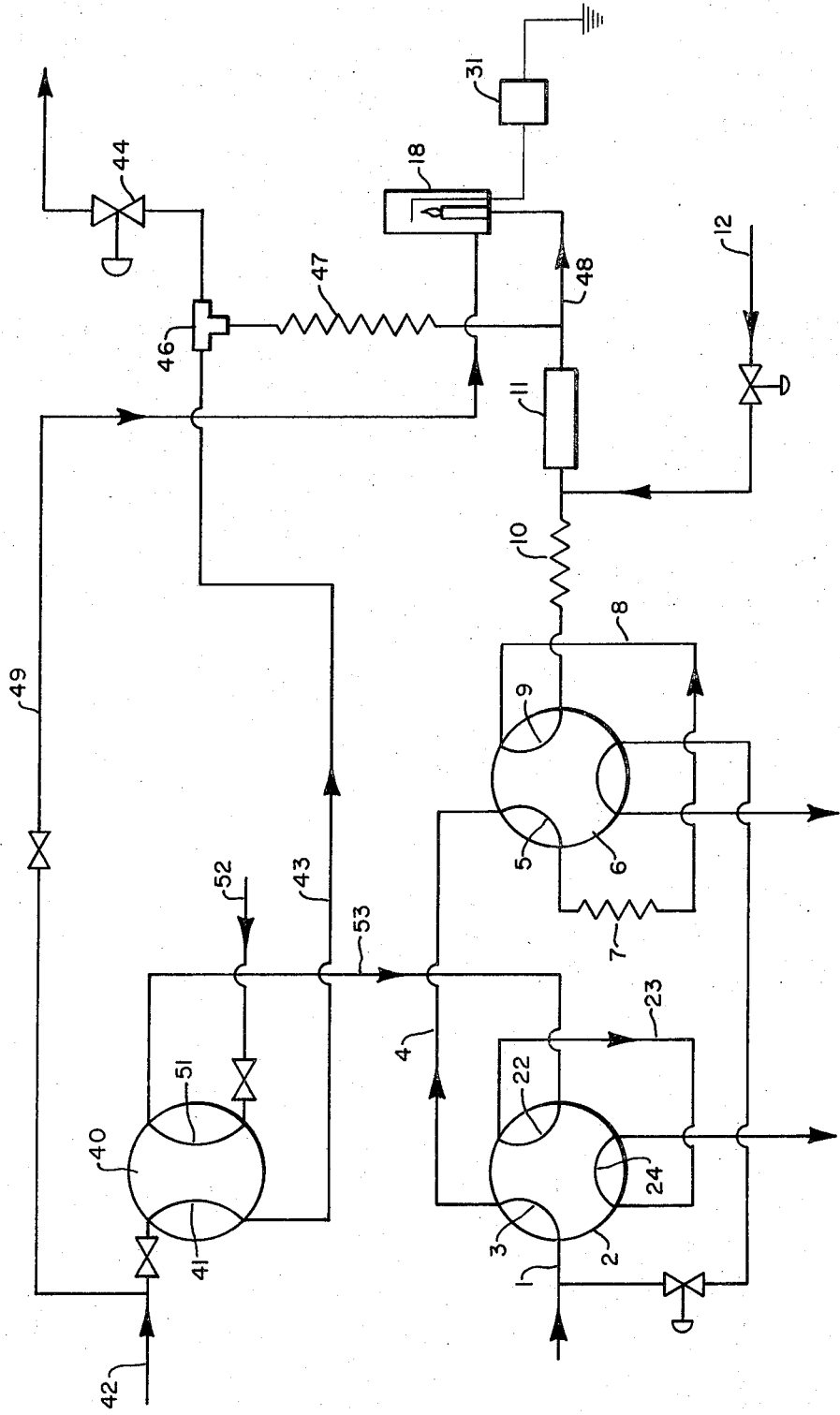
FIG. 2 is a similar view of the apparatus described and claimed herein in its normal condition while no analysis is being attempted.

Any variation in oxygen content of the air being sampled will change the zero level of the reading so that inaccurate readings are given. This is avoided with the present invention by establishing and maintaining a zero level or reference for the reading. This highly desirable result is accomplished by eliminating the second sample valve and delivering pure air to the hydrogen flame ionization detector at all times except when impure air is being analyzed for total hydrocarbons. Accordingly, as shown in FIG. 2, although the components and the circuit for analyzing for carbon monoxide and methane are essentially the same as in the prior art illustrated in FIG. 1, the sample normally is vented directly to atmosphere from a single sample valve, and the line leaving the reactor is connected directly with the detector, whereby the second sample valve 16 of FIG. 1 is eliminated. Sample valve 2, backflush valve 6, the two columns 7 and 10, the reactor 11 and detector 18 are the same as in FIG. 1 and are designated by the same reference numerals.

Testing for carbon monoxide and methane is effected in the same way as described above in connection with the prior art, but a reference or zero level has been established and maintained to avoid the errors of the past in measuring total hydrocarbons. To do this, a simple four-way valve 40, which may be a solenoid valve, is provided with a passage 41 that normally connects a line 42 from a suitable source of pure air (constant oxygen content) with a conduit 43 leading to a back pressure regulator 44 and the atmosphere. The regulator maintains a constant pressure in the conduit. The conduit is provided with a tee 46, one outlet of which is connected to an air restrictor, preferably in the form of a capillary tube 47, connected to a line 48 between the reactor 11 and the sample inlet of the hydrogen flame ionization detector 18. Consequently, a constant volume of air flows at a constant rate into the detector. The flow normally is set between 1 and 15 cc per minute, depending on sensitivity and design requirements. This pure air therefore establishes a reference for the analytical readings. Combustion air for the flame can be delivered through a line 49 connected to the pure air line upstream from valve 40. With valve 40 in the first or normal position just described, another passage 51 in it connects a line 52 from a suitable source of impure air to be sampled with a line 53 that leads to passage 22 of the sample valve 2 and the sample loop.

When it is desired to measure carbon monoxide and methane, valve 40 is left as it is shown in FIG. 2 but sample valve 2 is shifted to the position shown in FIG. 3 to connect sample loop 23 with line 4, columns 7 and 10, reactor 11 and the detector as explained in connection with FIG. 1. On the other hand, if total hydrocarbons in the sample air are to be measured, the valve 2 is switched back to its FIG. 2 position and valve 40 is switched to the position shown in FIG. 4 to shut off the flow of pure air to conduit 43 and to connect sample air line 52 through passage 41 with conduit 43 leading to the capillary and the back pressure regulator. The sample air, without the use of a carrier gas, therefore flows through the capillary and into the detector, in which total hydrocarbons are measured. The zero level will be identical to the zero level reading of the carbon monoxide and methane reading. While this is occurring, the passage 51 through the valve 40 connects line 42 with line 53 leading to the sample valve so that the sample loop 23 will be filled with pure air. This enables the pure air to be analyzed in the carbon monoxide and methane cycle if desired to make sure that it is really pure. Measurement of total hydrocarbons is not limited to slug analysis, as it was in the prior art, but can be continuous for as long as desired.

Figure 4:
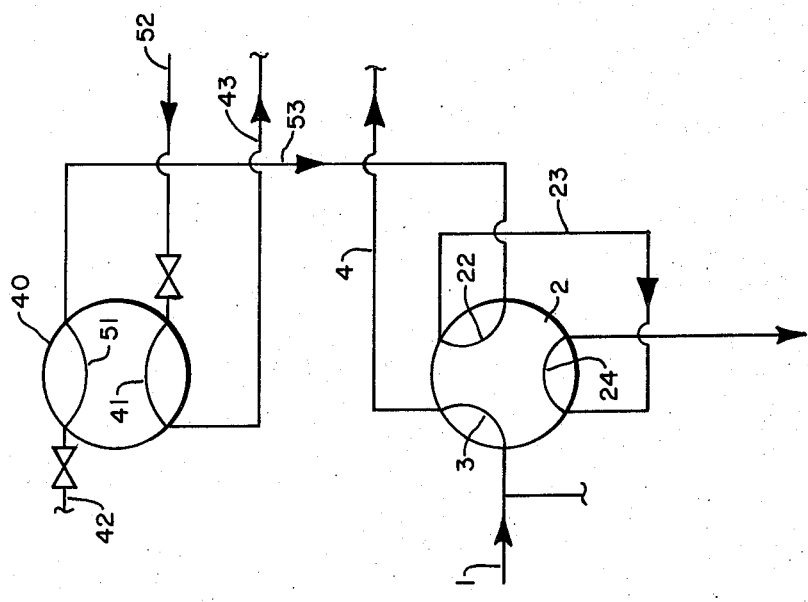
FIG. 4 is a similar view showing the position of the valves during testing for total hydrocarbons.
Figure 3:
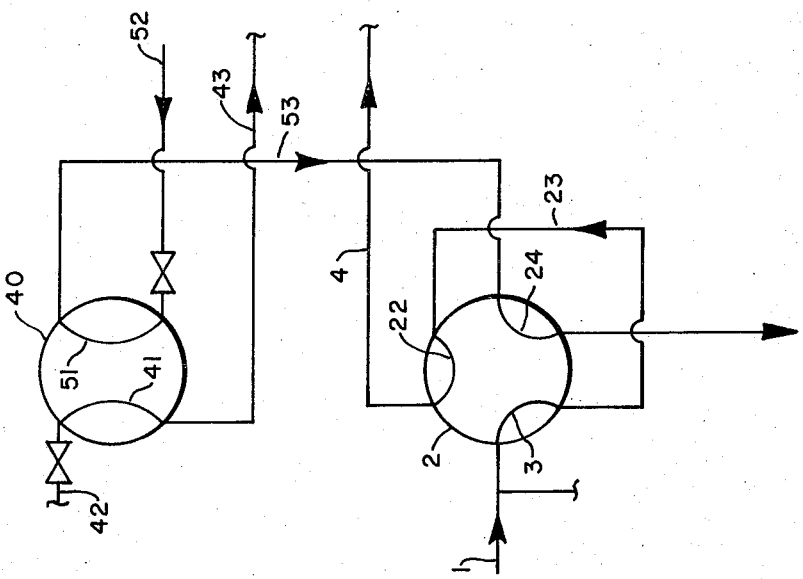
FIG. 3 is a fragmentary view showing the position of the valves while testing for carbon monoxide and methane.

It will be seen from the above description that line 1, valve passage 3, loop 23, valve passage 22 and line 4 constitute first means for delivering a carrier gas with an isolated air sample to column 7 as shown in FIG. 3. The electrical conductivity of detector 18 is measured by a second means 31. Conduit 43 communicates through capillary tube 47 with the inlet of the detector and a stream of pure air can be delivered to this conduit by third means consisting of line 42 and valve passage 41. To deliver a stream of sample air to conduit 43, fourth means formed from line 52 and valve passage 41 are used as shown in FIG. 4.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. Apparatus for determining the amount of carbon monoxide and methane and total hydrocarbons in impure air, comprising a chromatograph column for separating carbon monoxide and methane from an isolated sample of impure air, first means for delivering a carrier gas with said isolated air sample to the column, a reactor connected with the outlet of the column for converting said carbon monoxide into methane, a hydrogen flame ionization detector having an inlet connected with the outlet of the reactor, second means for measuring the electrical conductivity of said detector to indicate the amount of carbon monoxide and methane in said sample, a conduit communicating with said detector inlet, third means for delivering a continuous stream of pure air to said conduit while said sample is being conducted to the detector, and fourth means for selectively delivering a continuous stream of said sample air to the conduit in place of pure air and said isolated sample to enable the amount of total hydrocarbons in the sample air to be measured.

2. Apparatus according to claim 1, in which said conduit includes an air restrictor and an outlet to atmosphere at the upstream side of the restrictor, and a back pressure regulator connected with said outlet to maintain a constant pressure in said conduit.

3. Apparatus according to claim 1, in which said first means include a tube filled with said air sample, conduit means for continuously delivering a carrier gas to said column and normally by-passing said tube, and means for connecting said tube into said conduit means.

4. Apparatus according to claim 3, in which said fourth means normally delivers the sample air to said tube, and said tube normally is vented to atmosphere.

5. Apparatus according to claim 1, in which said third means includes a valve provided with a passage connecting a source of pure air with said conduit, and said fourth means likewise includes said valve switched to a position in which a valve passage connects a source of sample air with the conduit.

6. Apparatus according to claim 5, in which said first means include a tube filled with said sample air, conduit means for continuously delivering a carrier gas to said column and normally by-passing said tube, and means for connecting said tube into said conduit means, the apparatus including a sample line connected with said tube and connected by said valve with said source of sample air while the valve is connecting pure air with said conduit.

7. Apparatus according to claim 6, in which said valve is provided with a passage for connecting said source of pure air with said sample line while the valve is connecting said source of sample air with said conduit.

8. Apparatus according to claim 6, in which said conduit means include a second valve, and said connecting means likewise include the second valve switched to a position connecting said tube with said conduit means.

* * * * *